United States Patent
Guglielmetti

(10) Patent No.: US 11,224,987 B1
(45) Date of Patent: Jan. 18, 2022

(54) ABRASIVE-COLLECTING CONTAINER OF A WATERJET SYSTEM AND RELATED TECHNOLOGY

(71) Applicant: Omax Corporation, Kent, WA (US)

(72) Inventor: Brian K. Guglielmetti, Bonney Lake, WA (US)

(73) Assignee: OMAX Corporation, Kent, WA (US)

(*) Notice: Subject to any disclaimer, the term of this patent is extended or adjusted under 35 U.S.C. 154(b) by 350 days.

(21) Appl. No.: 16/296,524

(22) Filed: Mar. 8, 2019

Related U.S. Application Data

(60) Provisional application No. 62/641,205, filed on Mar. 9, 2018.

(51) Int. Cl.
*B26F 3/00* (2006.01)
*B24C 1/04* (2006.01)
*B24C 9/00* (2006.01)

(52) U.S. Cl.
CPC .............. *B26F 3/008* (2013.01); *B24C 1/045* (2013.01); *B24C 9/006* (2013.01)

(58) Field of Classification Search
CPC ........... B24C 1/045; B24C 1/04; B24C 1/003; B24C 3/065; B24C 3/067; B24C 5/04;
(Continued)

(56) References Cited

U.S. PATENT DOCUMENTS

| | | |
|---|---|---|
| 773,665 A | 11/1904 | Murray |
| 1,081,071 A | 12/1913 | Westland |

(Continued)

FOREIGN PATENT DOCUMENTS

| | | |
|---|---|---|
| CN | 101357809 A | 2/2009 |
| CN | 101811287 A | 8/2010 |

(Continued)

OTHER PUBLICATIONS

Ruppenthal, Michael, "Carinox S.A. Purchases Third Waterjet Cutting Machine from Flow International Corporation" (http://www.businesswire.com/news/home/20031218005772/en/Carinox), Business Wire, Dec. 18, 2003, p. 1, Kent, WA.

(Continued)

*Primary Examiner* — Orlando E Aviles
*Assistant Examiner* — Robert F Neibaur
(74) *Attorney, Agent, or Firm* — Perkins Coie LLP

(57) ABSTRACT

A waterjet system in accordance with at least one embodiment of the present technology includes a cutting head and an associated catcher assembly. The cutting head directs an abrasive-containing waterjet toward a workpiece supported by a cutting deck of the catcher assembly. The catcher assembly also includes a tank and a container fluidly connected to the tank. The tank contains abrasive-containing liquid in which the waterjet diffuses after the waterjet passes through the workpiece. The container collects abrasive at least primarily by shielding abrasive-containing liquid within the container from at least some turbulence of abrasive-containing liquid within the tank during operation of the waterjet system. The catcher assembly also includes a quick-release coupling through which the container is removably connected to the cutting deck. Operating the quick-release coupling allows the container to be removed to dispose of the collected abrasive.

15 Claims, 8 Drawing Sheets

(58) Field of Classification Search
CPC ....... B24C 5/02; B24C 7/0007; B24C 7/0053; B24C 9/006; B26F 3/004; B26F 3/008; B23Q 11/10
USPC .................. 451/40, 75, 99, 100, 101, 87
See application file for complete search history.

(56) References Cited

U.S. PATENT DOCUMENTS

| | | |
|---|---|---|
| 1,144,556 A | 6/1915 | Lowe |
| 1,684,431 A | 9/1928 | Behee, Jr. |
| 2,359,352 A | 10/1944 | Bucknam et al. |
| 2,929,120 A | 3/1960 | Brandt et al. |
| 2,985,050 A | 5/1961 | Schwacha |
| 3,014,665 A | 12/1961 | Shames et al. |
| 3,073,070 A | 1/1963 | Mead |
| 3,137,978 A | 6/1964 | Incantalupo |
| 3,148,484 A | 9/1964 | Meek |
| 3,201,901 A | 8/1965 | Pauli |
| 3,270,464 A | 9/1966 | Bowling, Jr. et al. |
| 3,413,794 A | 12/1968 | Bell et al. |
| 3,452,412 A | 7/1969 | Allman, Jr. et al. |
| 3,507,740 A | 4/1970 | Gaspari |
| 3,543,444 A | 12/1970 | Mehta |
| 3,553,895 A | 1/1971 | Power |
| 3,593,459 A | 7/1971 | Kulischenko |
| 3,708,936 A | 1/1973 | Rogers |
| 3,769,753 A | 11/1973 | Fleischer |
| 3,834,082 A | 9/1974 | Grudzinski |
| 4,048,918 A | 9/1977 | Peck |
| 4,049,545 A | 9/1977 | Horvath |
| 4,058,986 A | 11/1977 | Granholm |
| 4,075,789 A | 2/1978 | Dremann |
| 4,109,636 A | 8/1978 | Burge |
| 4,125,969 A | 11/1978 | Easton |
| 4,164,183 A | 8/1979 | Peck |
| 4,216,906 A | 8/1980 | Olsen et al. |
| 4,253,610 A | 3/1981 | Larkin |
| 4,280,913 A | 7/1981 | Applegate et al. |
| 4,340,185 A | 7/1982 | Braun et al. |
| 4,478,368 A | 10/1984 | Yie |
| 4,522,597 A | 6/1985 | Gallant |
| 4,534,427 A | 8/1985 | Wang et al. |
| 4,545,157 A | 10/1985 | Saurwein |
| 4,547,286 A | 10/1985 | Hsiung |
| 4,555,872 A | 12/1985 | Yie |
| 4,617,064 A | 10/1986 | Moore |
| 4,666,083 A | 5/1987 | Yie |
| 4,674,239 A | 6/1987 | Jodoin |
| 4,698,940 A | 10/1987 | Zwicker |
| 4,742,623 A | 5/1988 | Meurer et al. |
| 4,785,027 A | 11/1988 | Brasington et al. |
| 4,802,312 A | 2/1989 | Glaeser et al. |
| 4,802,993 A | 2/1989 | Katoh |
| 4,815,241 A | 3/1989 | Woodson |
| 4,816,284 A | 3/1989 | Magee |
| 4,817,342 A | 4/1989 | Martin et al. |
| 4,817,874 A | 4/1989 | Jarzebowicz |
| 4,820,913 A | 4/1989 | Haddock |
| 4,821,467 A | 4/1989 | Woodson et al. |
| 4,872,975 A | 10/1989 | Benson |
| 4,878,320 A | 11/1989 | Woodson |
| 4,934,111 A | 6/1990 | Hashish et al. |
| 4,951,429 A | 8/1990 | Hashish et al. |
| 4,955,164 A | 9/1990 | Hashish et al. |
| 4,984,397 A | 1/1991 | Van Leeuwen |
| 4,993,200 A | 2/1991 | Morioka et al. |
| 4,995,202 A | 2/1991 | Gardner et al. |
| 5,018,670 A | 5/1991 | Chalmers |
| 5,081,799 A | 1/1992 | Kirschner et al. |
| 5,098,229 A | 3/1992 | Meier et al. |
| 5,107,630 A | 4/1992 | Lodewijk |
| 5,109,636 A | 5/1992 | Lloyd et al. |
| 5,176,018 A | 1/1993 | Thompson |
| 5,192,532 A | 3/1993 | Guay et al. |
| 5,201,150 A | 4/1993 | Kuboyama et al. |
| 5,203,794 A | 4/1993 | Stratford et al. |
| 5,205,998 A | 4/1993 | Boone et al. |
| 5,230,185 A | 7/1993 | Kirschner et al. |
| 5,236,459 A | 8/1993 | Koch et al. |
| 5,239,788 A | 8/1993 | Woodson |
| 5,271,255 A | 12/1993 | Thompson |
| 5,320,289 A | 6/1994 | Hashish et al. |
| 5,330,167 A | 7/1994 | Plumb |
| 5,335,459 A | 8/1994 | Dale |
| 5,352,254 A | 10/1994 | Celikkaya |
| 5,363,556 A | 11/1994 | Banholzer et al. |
| 5,407,379 A | 4/1995 | Shank et al. |
| 5,413,270 A | 5/1995 | Lecherv y et al. |
| 5,415,584 A | 5/1995 | Brooke et al. |
| 5,421,766 A | 6/1995 | Shank, Jr. |
| 5,441,441 A | 8/1995 | Cook et al. |
| 5,468,066 A | 11/1995 | Hammonds |
| 5,472,367 A | 12/1995 | Slocum et al. |
| 5,484,325 A | 1/1996 | Shank |
| 5,492,497 A | 2/1996 | Brooke et al. |
| 5,508,596 A | 4/1996 | Olsen |
| 5,509,849 A | 4/1996 | Spears, Jr. |
| 5,588,901 A | 12/1996 | Rubey, III et al. |
| 5,591,064 A | 1/1997 | Spears, Jr. |
| 5,592,841 A | 1/1997 | Champaigne |
| 5,616,067 A | 4/1997 | Goenka |
| 5,637,030 A | 6/1997 | Chopra et al. |
| 5,643,058 A | 7/1997 | Erichsen et al. |
| 5,647,989 A | 7/1997 | Hayashi et al. |
| 5,649,694 A | 7/1997 | Buck |
| 5,679,058 A | 10/1997 | Rhoades |
| 5,704,824 A | 1/1998 | Hashish et al. |
| 5,730,635 A | 3/1998 | De Haas et al. |
| 5,759,086 A | 6/1998 | Klingel |
| 5,771,873 A | 6/1998 | Potter et al. |
| 5,800,246 A | 9/1998 | Tomioka |
| 5,851,139 A | 12/1998 | Xu |
| 5,876,267 A | 3/1999 | Kanda |
| 5,892,345 A | 4/1999 | Olsen |
| 5,908,349 A | 6/1999 | Warehime |
| 5,928,493 A | 7/1999 | MorkovskV et al. |
| 5,947,800 A | 9/1999 | Fring |
| 5,979,663 A | 11/1999 | Hermann et al. |
| 6,001,265 A | 12/1999 | Toyama et al. |
| 6,077,152 A | 6/2000 | Warehime |
| 6,083,001 A | 7/2000 | Deardon et al. |
| 6,098,677 A | 8/2000 | Wegman et al. |
| 6,099,388 A | 8/2000 | Fritsch et al. |
| 6,120,351 A | 9/2000 | Zeng |
| 6,136,386 A | 10/2000 | Nakahigashi et al. |
| 6,155,245 A | 12/2000 | Zanzuri |
| 6,168,503 B1 | 1/2001 | Pao et al. |
| 6,200,203 B1 | 3/2001 | Xu et al. |
| 6,227,768 B1 | 5/2001 | Higuchi et al. |
| 6,248,369 B1 | 6/2001 | Nier et al. |
| 6,276,993 B1 | 8/2001 | Miller |
| 6,280,302 B1 | 8/2001 | Hashish et al. |
| 6,283,833 B1 | 9/2001 | Pao et al. |
| 6,299,510 B1 * | 10/2001 | Massenburg ............ B26F 3/008 451/38 |
| 6,328,638 B1 | 12/2001 | Hopkins et al. |
| 6,346,197 B1 | 2/2002 | Stephenson et al. |
| 6,361,416 B1 | 3/2002 | Hopkins et al. |
| 6,375,547 B1 | 4/2002 | Massenburg |
| 6,390,898 B1 | 5/2002 | Pieper |
| 6,425,804 B1 | 7/2002 | Pettit et al. |
| 6,533,640 B1 | 3/2003 | Nopwaskey et al. |
| 6,533,643 B1 | 3/2003 | Feng |
| 6,548,173 B2 | 4/2003 | Erdemir et al. |
| 6,607,670 B2 | 8/2003 | Baldwin et al. |
| 6,676,039 B2 | 1/2004 | Lindsey et al. |
| 6,746,593 B2 | 6/2004 | Herbst |
| 6,752,685 B2 | 6/2004 | Ulrich et al. |
| 6,804,459 B2 | 10/2004 | Raghavan et al. |
| 6,922,605 B1 | 7/2005 | Olsen |
| 6,932,285 B1 | 8/2005 | Zeng |
| 6,970,793 B2 | 11/2005 | Pearson et al. |
| 7,014,770 B2 | 3/2006 | Umezawa et al. |
| 7,035,708 B1 | 4/2006 | Olsen |

(56) References Cited

U.S. PATENT DOCUMENTS

| | | | |
|---|---|---|---|
| 7,040,959 B1 | 5/2006 | Panuska et al. | |
| 7,074,112 B2 | 7/2006 | Olsen | |
| 7,090,054 B2* | 8/2006 | Iwamasa | F16N 31/004 |
| | | | 184/106 |
| 7,094,135 B2 | 8/2006 | Chisum et al. | |
| 7,108,585 B1 | 9/2006 | Dorfman et al. | |
| 7,138,063 B1 | 11/2006 | Teter et al. | |
| 7,153,186 B2 | 12/2006 | Popescu et al. | |
| 7,419,418 B2 | 9/2008 | Alberts et al. | |
| 7,465,215 B2 | 12/2008 | Shimizu et al. | |
| 7,485,027 B2 | 2/2009 | Miller | |
| 7,549,911 B2 | 6/2009 | Nguyen | |
| 7,585,201 B2 | 9/2009 | Kanai et al. | |
| 7,758,742 B2 | 7/2010 | Powell | |
| 7,815,490 B2 | 10/2010 | Liu | |
| 7,959,790 B2 | 6/2011 | Woytowich et al. | |
| 7,980,923 B2 | 7/2011 | Olmo et al. | |
| 7,981,301 B2 | 7/2011 | Powell | |
| 8,048,279 B2 | 11/2011 | Powell et al. | |
| 8,123,591 B2 | 2/2012 | Olsen | |
| 8,308,525 B2 | 11/2012 | Hashish et al. | |
| 8,342,912 B2 | 1/2013 | Funatsu et al. | |
| 8,475,230 B2 | 7/2013 | Summers et al. | |
| 8,593,086 B2 | 11/2013 | Hay et al. | |
| 8,821,213 B2 | 9/2014 | Liu et al. | |
| 8,892,236 B2 | 11/2014 | Olsen | |
| 8,904,912 B2 | 12/2014 | Raghavan et al. | |
| 8,920,213 B2 | 12/2014 | Liu | |
| 9,003,955 B1 | 4/2015 | Stang et al. | |
| 9,011,204 B2 | 4/2015 | Raghavan et al. | |
| 9,044,873 B2 | 6/2015 | Guglielmetti et al. | |
| 9,050,704 B1 | 6/2015 | Liu et al. | |
| 9,067,331 B2 | 6/2015 | Stang | |
| 9,090,808 B1 | 7/2015 | Liu et al. | |
| 9,095,955 B2 | 8/2015 | Raghavan et al. | |
| 9,108,297 B2 | 8/2015 | Schubert et al. | |
| 9,138,863 B2 | 9/2015 | Schubert et al. | |
| 9,273,682 B2 | 3/2016 | Stang | |
| 9,283,656 B2 | 3/2016 | Schubert et al. | |
| 9,370,871 B2* | 6/2016 | Hashish | B24C 3/065 |
| 9,492,908 B2 | 11/2016 | Schubert et al. | |
| 9,586,306 B2 | 3/2017 | Zhang et al. | |
| 9,610,674 B2 | 4/2017 | Raghavan et al. | |
| 9,636,799 B2 | 5/2017 | Liu et al. | |
| 9,638,357 B1 | 5/2017 | Raghavan et al. | |
| 9,649,744 B2 | 5/2017 | Raghavan et al. | |
| 9,658,613 B2 | 5/2017 | Henning et al. | |
| 9,720,399 B2 | 8/2017 | Henning et al. | |
| 9,727,051 B2 | 8/2017 | Henning et al. | |
| 9,772,620 B2 | 9/2017 | Henning et al. | |
| 9,810,205 B2 | 11/2017 | Raghavan et al. | |
| 9,827,649 B2 | 11/2017 | Schubert et al. | |
| 9,891,617 B2 | 2/2018 | Henning et al. | |
| 9,976,675 B1 | 5/2018 | Raghavan et al. | |
| 9,989,954 B2 | 6/2018 | Henning et al. | |
| 10,010,999 B2 | 7/2018 | Raghavan et al. | |
| 10,048,676 B2 | 8/2018 | Henning et al. | |
| 10,146,209 B2 | 12/2018 | Henning et al. | |
| 10,201,914 B2* | 2/2019 | Schlough | B24C 1/045 |
| 10,564,627 B2 | 2/2020 | Henning et al. | |
| 10,606,240 B2 | 3/2020 | Henning et al. | |
| 10,642,252 B2 | 5/2020 | Henning et al. | |
| 10,656,622 B2 | 5/2020 | Henning et al. | |
| 10,675,733 B2 | 6/2020 | Zhang et al. | |
| 10,780,551 B2 | 9/2020 | Zhang et al. | |
| 10,801,651 B2 | 10/2020 | Olsen et al. | |
| 10,808,688 B1 | 10/2020 | Raghavan et al. | |
| 10,859,997 B1 | 12/2020 | Miles et al. | |
| 10,864,613 B2 | 12/2020 | Raghavan et al. | |
| 10,981,259 B2* | 4/2021 | Lerea | B24C 9/00 |
| 10,983,503 B2 | 4/2021 | Henning et al. | |
| 10,990,080 B2 | 4/2021 | Henning et al. | |
| 2001/0030245 A1 | 10/2001 | Lindsey et al. | |
| 2001/0046833 A1 | 11/2001 | Hashish et al. | |
| 2002/0028634 A1 | 3/2002 | Massenburg | |
| 2003/0034122 A1 | 2/2003 | Asai | |
| 2003/0044380 A1 | 3/2003 | Zhu et al. | |
| 2003/0085295 A1 | 5/2003 | Dijkman et al. | |
| 2003/0166378 A1 | 9/2003 | Fuksshimov et al. | |
| 2003/0224704 A1 | 12/2003 | Shank | |
| 2004/0107810 A1 | 6/2004 | Sciulli et al. | |
| 2004/0132383 A1 | 7/2004 | Langford et al. | |
| 2004/0198179 A1 | 10/2004 | Gadd | |
| 2005/0017091 A1 | 1/2005 | Olsen et al. | |
| 2005/0070205 A1 | 3/2005 | Korovin et al. | |
| 2005/0239371 A1 | 10/2005 | Togawa | |
| 2006/0219825 A1 | 10/2006 | Rohring et al. | |
| 2006/0223423 A1 | 10/2006 | Dorfman et al. | |
| 2007/0021039 A1 | 1/2007 | Haslett | |
| 2007/0037495 A1 | 2/2007 | Matsubara et al. | |
| 2007/0128988 A1 | 6/2007 | Rivir et al. | |
| 2007/0131455 A1 | 6/2007 | Blange | |
| 2007/0154561 A1 | 7/2007 | Takeda et al. | |
| 2007/0155289 A1 | 7/2007 | Miller | |
| 2007/0218808 A1 | 9/2007 | Shimizu et al. | |
| 2008/0060493 A1 | 3/2008 | Liu | |
| 2008/0110311 A1 | 5/2008 | Stangherlin | |
| 2009/0042492 A1 | 2/2009 | Hashish | |
| 2009/0064832 A1 | 3/2009 | Caretta et al. | |
| 2009/0214628 A1 | 8/2009 | de Rijk | |
| 2009/0229793 A1 | 9/2009 | Treb et al. | |
| 2009/0258582 A1 | 10/2009 | Miller | |
| 2009/0318064 A1 | 12/2009 | Hashish | |
| 2010/0003894 A1 | 1/2010 | Miller et al. | |
| 2010/0124872 A1 | 5/2010 | Hashish et al. | |
| 2010/0269593 A1 | 10/2010 | Moser et al. | |
| 2011/0269382 A1 | 11/2011 | Deleris | |
| 2012/0021676 A1 | 1/2012 | Schubert et al. | |
| 2012/0085211 A1 | 4/2012 | Liu et al. | |
| 2012/0145647 A1 | 6/2012 | Volkel et al. | |
| 2012/0156969 A1 | 6/2012 | Liu | |
| 2012/0160706 A1 | 6/2012 | Poirier et al. | |
| 2012/0196516 A1 | 8/2012 | Funatsu et al. | |
| 2012/0252325 A1 | 10/2012 | Schubert et al. | |
| 2012/0252326 A1 | 10/2012 | Schubert et al. | |
| 2012/0282845 A1 | 11/2012 | Whang et al. | |
| 2013/0005225 A1 | 1/2013 | Russo | |
| 2013/0025425 A1* | 1/2013 | Knaupp | B26F 3/008 |
| | | | 83/177 |
| 2013/0105717 A1 | 5/2013 | Nguyen | |
| 2013/0267152 A1 | 10/2013 | Tera et al. | |
| 2014/0045409 A1 | 2/2014 | Zhang et al. | |
| 2014/0273768 A1* | 9/2014 | Guglielmetti | B26F 3/008 |
| | | | 451/87 |
| 2015/0031270 A1 | 1/2015 | Miller | |
| 2015/0336239 A1 | 11/2015 | Liu et al. | |
| 2016/0325401 A1 | 11/2016 | Meyer | |
| 2017/0165810 A1 | 6/2017 | Zhang et al. | |
| 2017/0190021 A1 | 7/2017 | Zhang et al. | |
| 2017/0297168 A1 | 10/2017 | Raghavan et al. | |
| 2018/0161958 A1 | 6/2018 | Schubert et al. | |
| 2018/0264625 A1 | 9/2018 | Schneidau et al. | |
| 2018/0320802 A1 | 11/2018 | Raghavan et al. | |
| 2018/0364679 A1 | 12/2018 | Henning et al. | |
| 2019/0101894 A1 | 4/2019 | Henning et al. | |
| 2019/0249805 A1 | 8/2019 | Olsen et al. | |
| 2020/0007254 A1 | 1/2020 | Hay et al. | |
| 2020/0406424 A1 | 12/2020 | Zhang et al. | |
| 2021/0046610 A1 | 2/2021 | Schubert et al. | |
| 2021/0187778 A1 | 6/2021 | Denney et al. | |

FOREIGN PATENT DOCUMENTS

| | | |
|---|---|---|
| CN | 201785277 U | 4/2011 |
| CN | 102139978 B | 8/2011 |
| CN | 202415300 U | 9/2012 |
| EP | 0165690 A2 | 12/1985 |
| EP | 0761603 A1 | 3/1997 |
| FR | 2452969 | 10/1985 |
| GB | 2198975 A | 6/1988 |
| GB | 2483740 A | 3/2012 |
| JP | 2012157956 A | 8/2012 |
| KR | 1019930008692 B1 | 9/1993 |
| KR | 101678356 B1 | 11/2016 |

(56) References Cited

FOREIGN PATENT DOCUMENTS

| WO | 2002085572 A1 | 10/2002 |
|----|---------------|---------|
| WO | 2003011524 A1 | 2/2003 |
| WO | 03055644 A1 | 7/2003 |
| WO | 2009050251 A2 | 4/2009 |
| WO | 2010122336 A2 | 10/2010 |
| WO | 2017134242 A1 | 8/2017 |
| WO | 2018197018 A1 | 11/2018 |

OTHER PUBLICATIONS

Operation Manual Abrasive Delivery System Type ADS-24-11, Straaltechniek International B.V., © Flow Europe GmbH, Jul. 2000, 28 pages, The Netherlands.

Bakalar, Tomas et al., "Heavy metal removal using reverse osmosis", Acta Montanistica Slovaca Rocnik 14 (2009), cislo 3, 250-253.

Hashish, M., "Waterjet Machine Tool of the Future", 9th American Waterjet Conference, Aug. 23-26, 1997, Paper 58, 15 pages.

Tsai, Feng-Che et al., "Abrasive jet polishing of micro groove using compound SiC abrasives with compound additives", Advanced Materials Research vols. 481-420 (2012), pp. 2153-2157, © 2012 Trans Tech Publications, Switzerland.

Fox Solids Conveying Educators, http://www.flowmeterdirectory.com/solid-conveying-eductor.html, accessed May 24, 2011, 2 pages.

Hashish, Porter Cable Pancake Compressor Instruction Manual, 2006, 66 pages.

\* cited by examiner

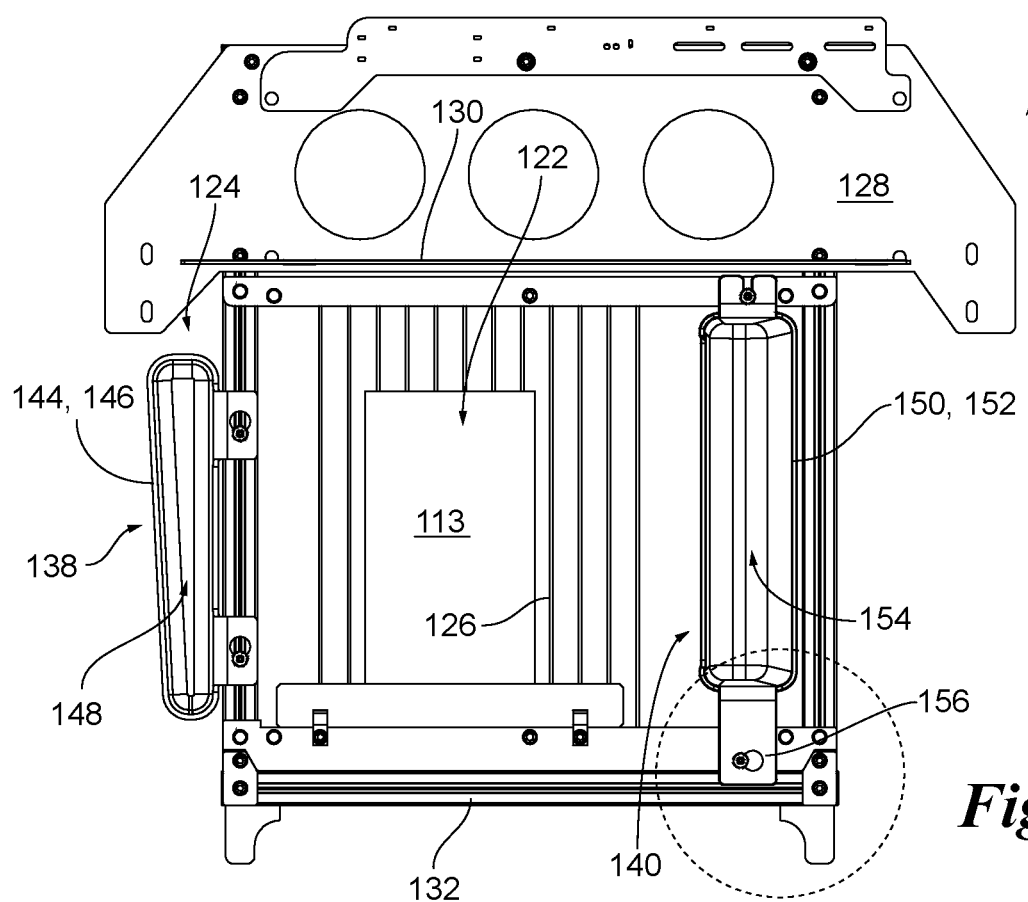
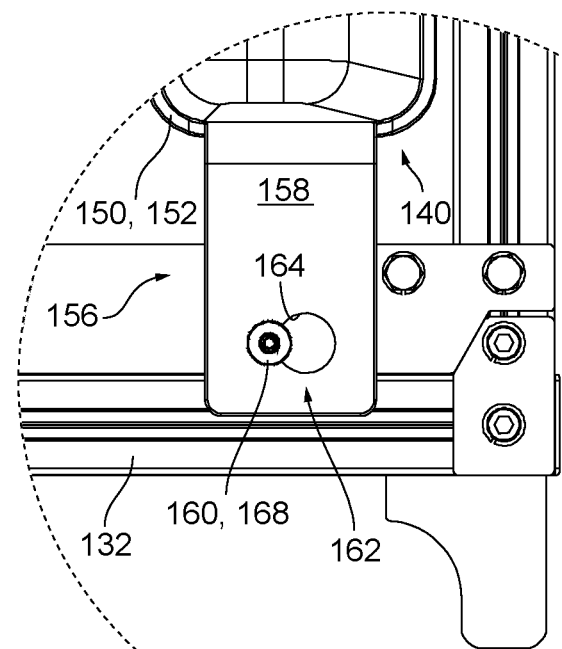
*Fig. 6*
*Fig. 7*

ABRASIVE-COLLECTING CONTAINER OF A WATERJET SYSTEM AND RELATED TECHNOLOGY

CROSS-REFERENCE TO RELATED APPLICATIONS INCORPORATED BY REFERENCE

This application claims the benefit of U.S. provisional application No. 62/641,205, filed Mar. 9, 2018 and entitled ABRASIVE-COLLECTING CONTAINER OF A WATERJET SYSTEM AND RELATED TECHNOLOGY. The foregoing application is incorporated herein by reference in its entirety. To the extent the foregoing application or any other material incorporated herein by reference conflicts with the present disclosure, the present disclosure controls.

TECHNICAL FIELD

The present technology is related to abrasive collection in waterjet systems.

BACKGROUND

Waterjet systems are used in precision cutting, shaping, carving, reaming, and other material processing applications. During operation of a waterjet system, a cutting head directs a high-velocity jet of liquid carrying particles of abrasive material toward a workpiece to rapidly erode portions of the workpiece. Waterjet processing has significant advantages over other material processing technologies (e.g., grinding, plasma-cutting, etc.). For example, waterjet systems tend produce relatively fine and clean cuts without heat-affected zones around the cuts. Waterjet systems also tend to be highly versatile with respect to the material type of the workpiece. The range of materials that can be processed using waterjet systems includes very soft materials (e.g., rubber, foam, leather, and paper) as well as very hard materials (e.g., stone, ceramic, and hardened metal). Furthermore, in many cases, waterjet systems are capable of executing demanding material processing operations while generating little or no dust, smoke, or other potentially toxic airborne byproducts.

Waterjet systems typically include a catcher containing a volume of liquid in which the waterjet diffuses after passing through the workpiece. As the waterjet diffuses, liquid and abrasive from the waterjet become incorporated into the volume of liquid. Eventually, the amount of abrasive in the volume of liquid increases to an unacceptable level. Removing the accumulated abrasive can be laborious. For example, one conventional approach to removing accumulated abrasive from a catcher of a waterjet system involves draining the catcher, shoveling out the accumulated abrasive, and then refilling the catcher. In addition to being laborious, this and other conventional approaches often cause significant system downtime, which can be costly. For these and/or other reasons, there is a need for innovation related to abrasive collection in waterjet systems.

BRIEF DESCRIPTION OF THE DRAWINGS

FIG. 6 is a top plan view of the cutting deck and associated components of the waterjet system shown in FIG. 1.

FIG. 7 is an enlarged view of a portion of FIG. 6.

DETAILED DESCRIPTION

Figure 1:
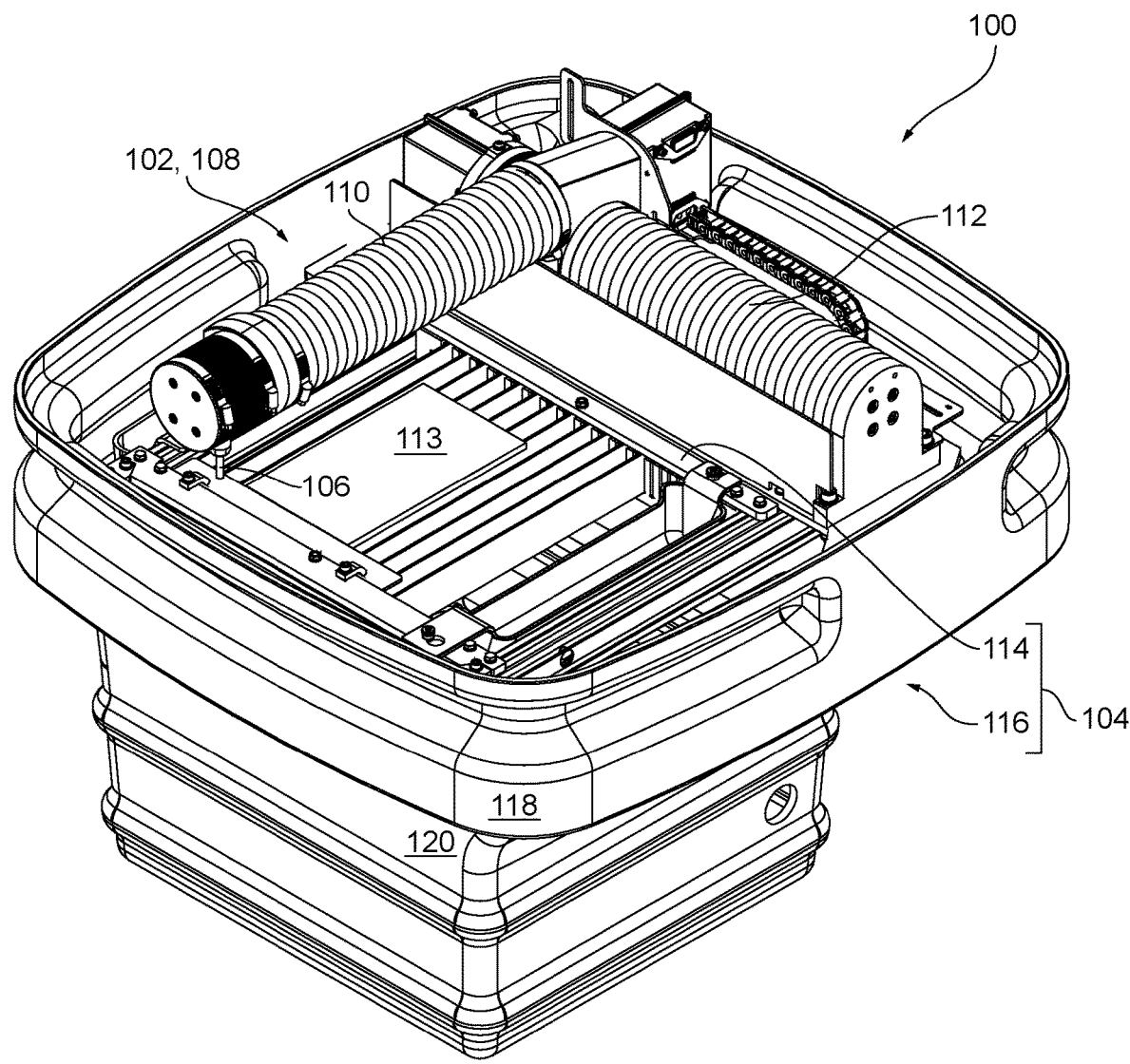
FIG. 1 is a perspective view of a waterjet system in accordance with at least some embodiments of the present technology.

Waterjet systems in accordance with at least some embodiments of the present technology include features that facilitate convenient removal of used abrasive. For example, a waterjet system in accordance with a particular embodiment includes a catcher assembly having a stationary tank and a container removably connected to the tank. The tank can contain a volume of abrasive-containing liquid in which a waterjet from a cutting head of the waterjet system diffuses after passing through a workpiece. Energy from the waterjet can cause a bulk portion of the volume of abrasive-containing liquid to be well mixed and to migrate into and out of the container. In contrast to relatively high turbulence within the bulk portion of the volume of abrasive-containing liquid, turbulence within the container may be relatively low such that abrasive within the container tends to settle. After enough abrasive has settled, a user of the system can conveniently remove, empty, and then replace the container. This approach to removal of used abrasive from a waterjet system can enhance the usability of the system, reduce system downtime, and/or have other advantages relative to conventional approaches. As described below, waterjet systems and related devices, systems, and methods in accordance with embodiments of the present technology can have features in addition to or instead of the foregoing features.

Specific details of waterjet systems and related devices, systems, and methods in accordance with several embodiments of the present technology are disclosed herein with reference to FIGS. 1-10. Although the systems, devices, and methods may be disclosed herein primarily or entirely with respect to hobbyist and light industrial abrasive waterjet applications, other applications (e.g., heavy industrial waterjet application) in addition to those disclosed herein are within the scope of the present technology. Furthermore, it should be understood, in general, that other systems, devices, and methods in addition to those disclosed herein are within the scope of the present technology. For example, systems, devices, and methods in accordance with embodiments of the present technology can have different and/or additional configurations, components, and procedures than those disclosed herein. Moreover, a person of ordinary skill in the art will understand that systems, devices, and methods in accordance with embodiments of the present technology can be without one or more of the configurations, components, and/or procedures disclosed herein without deviating from the present technology. Waterjet systems in accordance with embodiments of the present technology can be used with a variety of suitable fluids, such as water, aqueous solutions, hydrocarbons, glycols, and nitrogen. As such, although the term "waterjet" is used herein for ease of reference, unless the context clearly indicates otherwise, the term refers to a jet formed by any suitable fluid, and is not limited exclusively to water or aqueous solutions.

Figure 2:
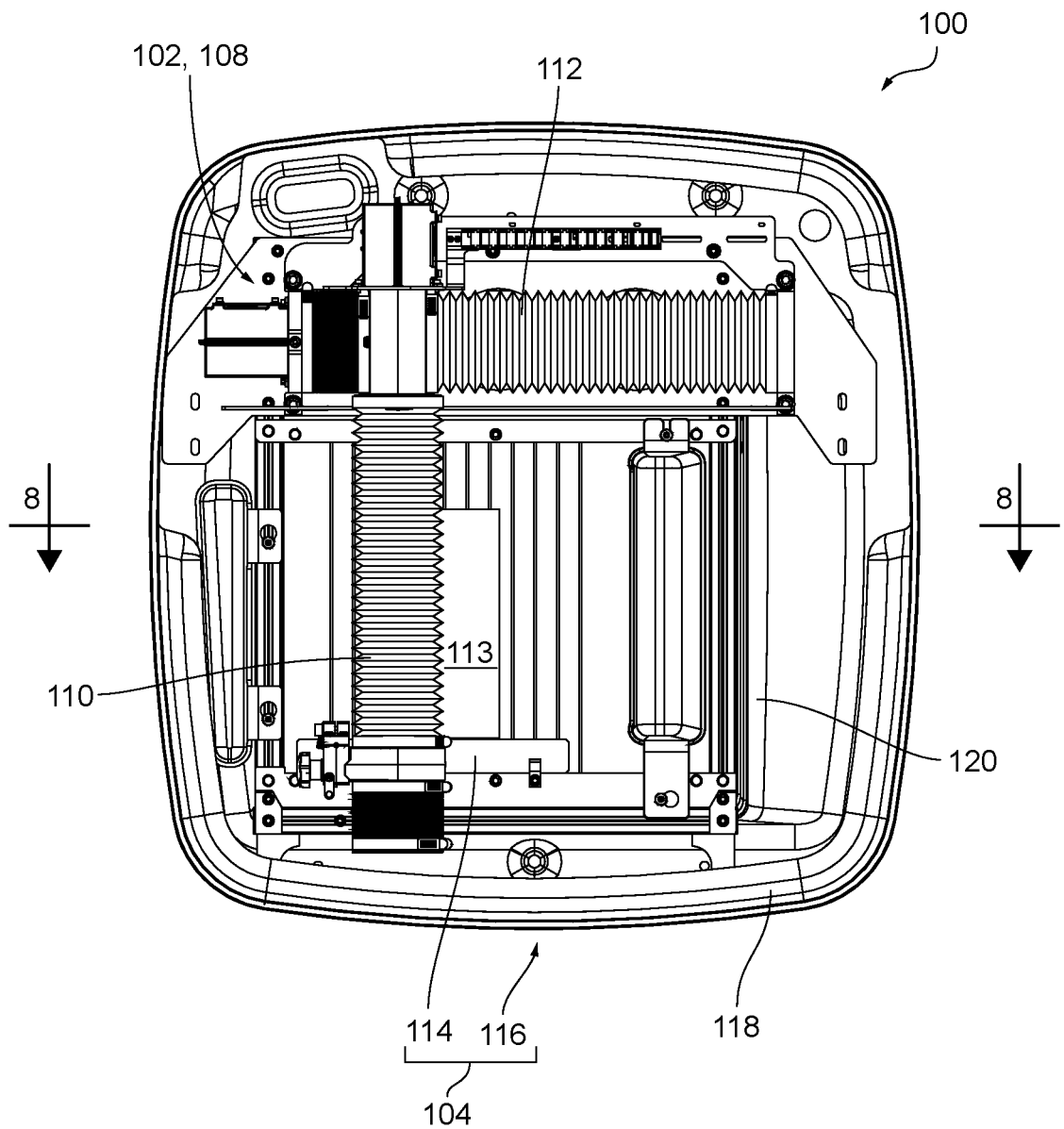
FIG. 2 is a top plan view of the waterjet system shown in FIG. 1.
Figure 3:
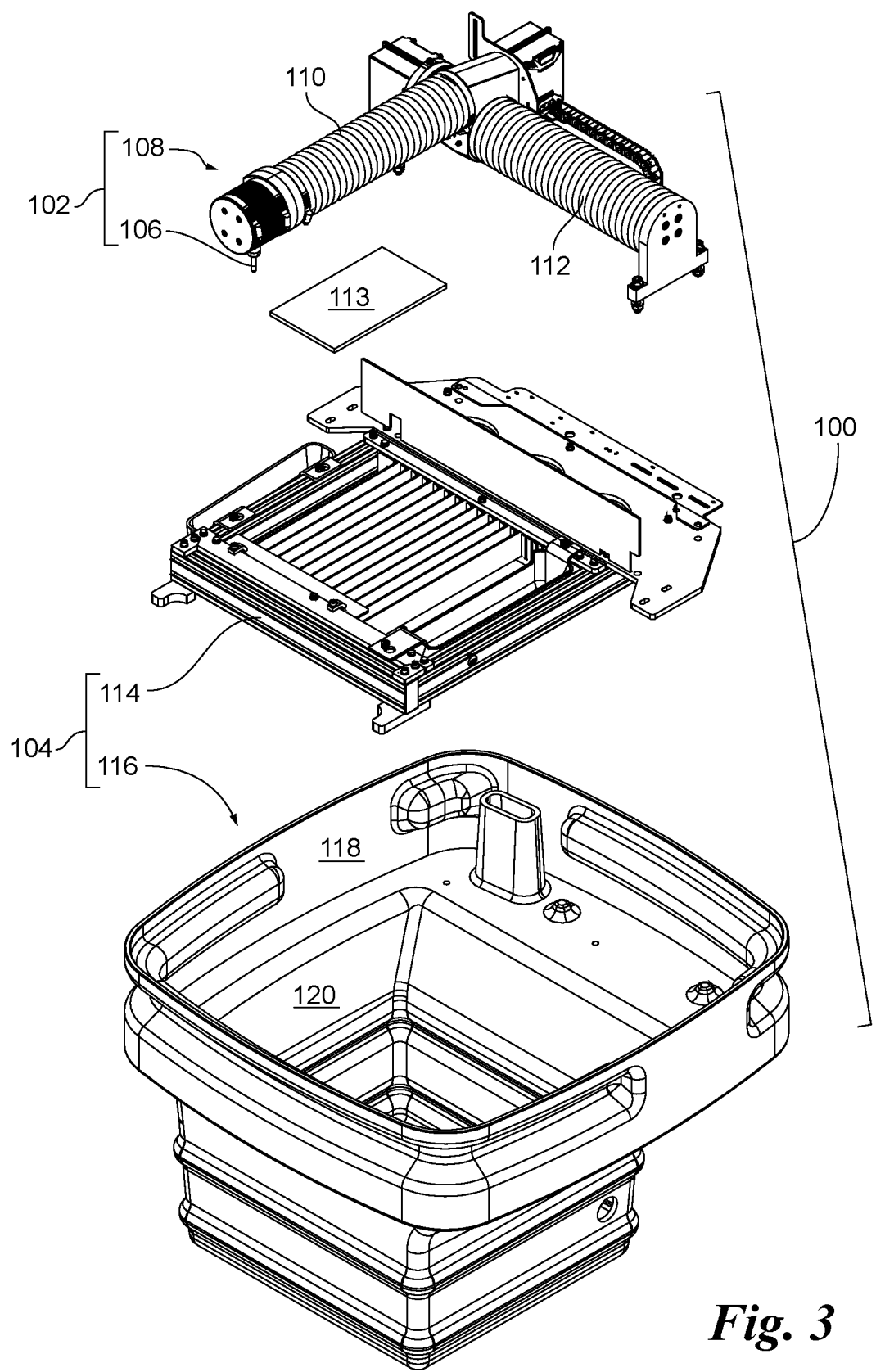
FIG. 3 is an exploded perspective view of the waterjet system shown in FIG. 1.

FIGS. 1-3 are, respectively, a perspective view, a top plan view, and an exploded perspective view of a waterjet system 100 in accordance with at least some embodiments of the present technology. With reference to FIGS. 1-3 together, the waterjet system 100 can include a cutting assembly 102 and a catcher assembly 104 operably associated with one another. As part of the cutting assembly 102, the waterjet system 100 can include a cutting head 106 and a horizontal motion assembly 108 carrying the cutting head 106. The horizontal motion assembly 108 can include a first track 110 configured to move the cutting head 106 along a first axis, and a second track 112 configured to move both the cutting head 106 and the first track 110 along a second axis (e.g., an axis perpendicular to the first axis). In at least some cases, the first and second axes are, respectively, a y-axis and an x-axis of the horizontal motion assembly 108. The cutting head 106 can be configured to direct an abrasive-containing waterjet (not shown) toward a workpiece 113. Supply lines that feed abrasive and ultrahigh pressure liquid to the cutting head 106 are not shown for the sake of clarity. The catcher assembly 104 can include a cutting deck 114 configured to support the workpiece 113, and a tank 116 configured to contain abrasive-containing liquid (not shown) in which the waterjet diffuses after the waterjet passes through the workpiece 113. As illustrated, the tank 116 can have a wide and shallow upper portion 118 that receives the cutting deck 114, and a narrower and deeper lower portion 120 below the cutting deck 114.

Figure 4:
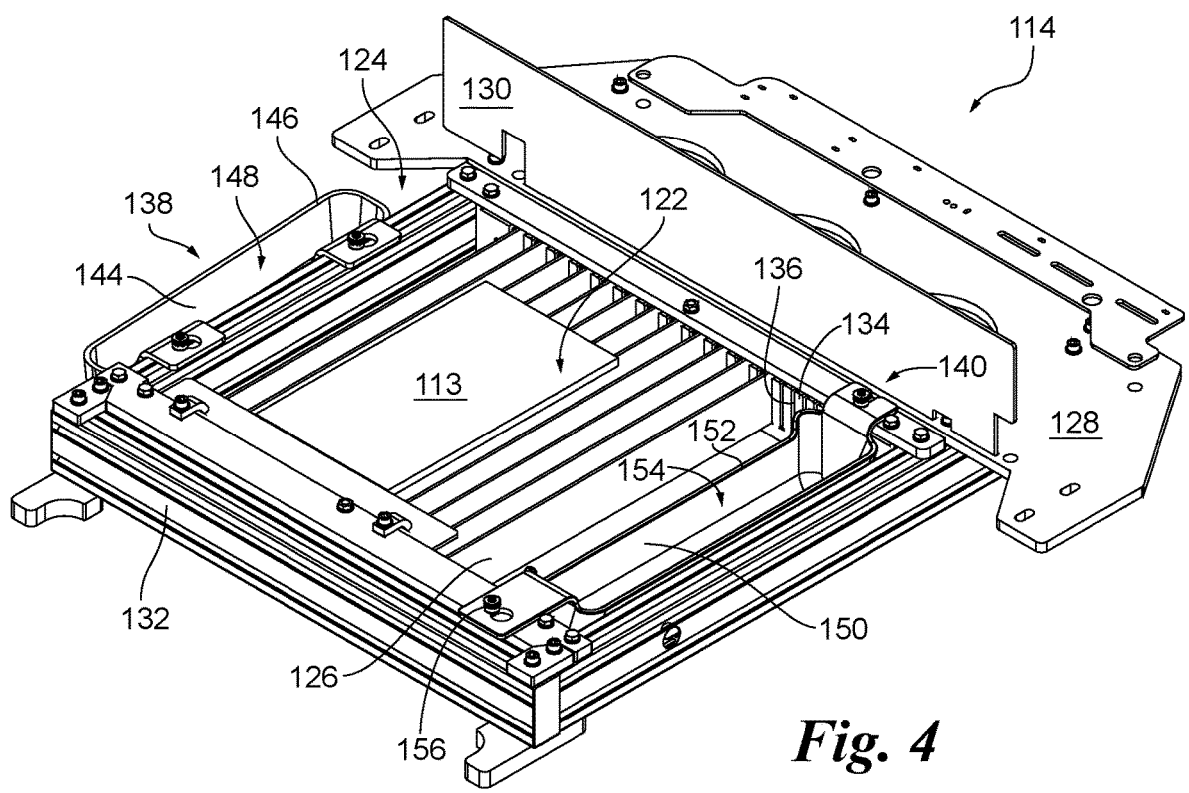
FIG. 4 is a perspective view of a cutting deck and associated components of the waterjet system shown in FIG. 1.
Figure 5:
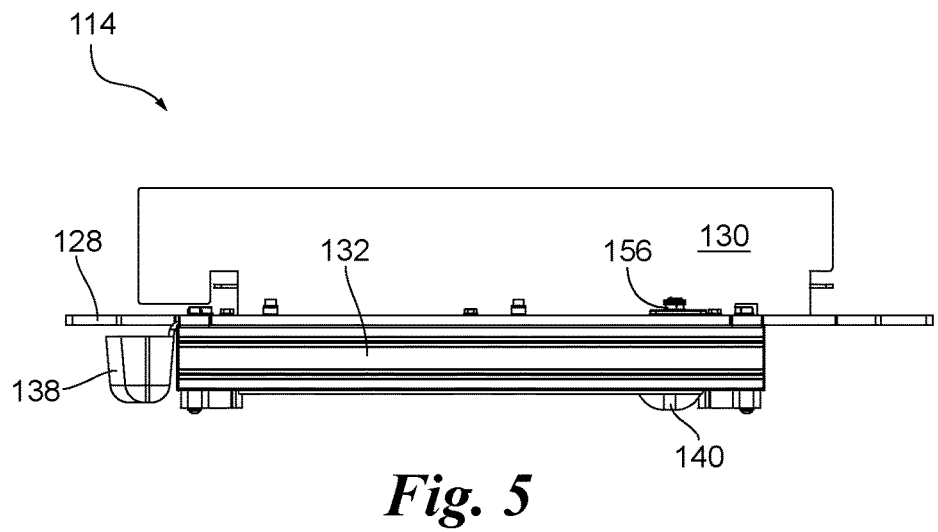
FIG. 5 is a front profile view of the cutting deck and associated components of the waterjet system shown in FIG. 1.

FIGS. 4-6 are, respectively, a perspective view, a front profile view, and a top plan view of the cutting deck 114 and associated components of the waterjet system 100. With reference to FIGS. 4-6 together, the cutting deck 114 can have a central portion 122 and a peripheral portion 124 extending around the central portion 122. At its central portion 122, the cutting deck 114 can include removable slats 126 configured to support the workpiece 113. The cutting deck 114 can also include a mounting plate 128 configured to support the horizontal motion assembly 108. Between the slats 126 and the mounting plate 128, the cutting deck 114 can include a shield 130 configured to protect the horizontal motion assembly 108 from abrasive that deflects from the workpiece 113. At its peripheral portion 124, the cutting deck 114 can include a frame 132 carrying the slats 126, the mounting plate 128, and the shield 130. For example, the frame 132 can include a first comb 134 and an opposite second comb (not shown—positioned at or near ends of the slates 126 opposite the first comb 134) having upwardly opening slots 136 configured to receive the slats 126.

With reference now to FIGS. 1-6 together, the waterjet system 100 can further include a removable first container 138 and/or a removable second container 140 configured to collect abrasive from abrasive-containing liquid within the catcher assembly 104 during operation of the waterjet system 100. For example, the first and second containers 138, 140 can be fluidly connected to the tank 116 and configured to collect abrasive from abrasive-containing liquid that circulates into the first and second containers 138, 140 from a main portion of the tank 116. This circulation of abrasive-containing liquid through the tank 116 and through the first and second containers 138, 140 can be at least primarily due to turbulence from the waterjet during operation of the waterjet system 100. In at least some cases, the first and second containers 138, 140 are configured to collect abrasive at least primarily by shielding abrasive-containing liquid from at least some of the turbulence within the main portion of the tank 116. Thus, turbulence within the main portion of the tank 116 may tend to prevent abrasive from settling, whereas a relative lack of turbulence within the first and second containers 138, 140 may allow abrasive to settle.

As shown in FIGS. 4-6, the first container 138 can include a first wall 144 having a first upper rim 146 defining a first opening 148 through which abrasive-containing liquid moves into and out of the first container 138. Similarly, the second container 140 can include a second wall 150 having a second upper rim 152 defining a second opening 154 through which abrasive-containing liquid moves into and out of the second container 140. The first and second upper rims 146, 152 can be configured to be at least partially submerged below a surface of abrasive-containing liquid within the catcher assembly 104 during operation of the waterjet system 100. In some embodiments, the first and/or second upper rims 146, 152 are aligned substantially horizontally (e.g., parallel to the surface of the water in the tank 116) when installed. In some embodiments, all or a portion of the first and/or second upper rims 146, 152 are not horizontal when installed. For example, all or portion of the first and/or second upper rims 146, 152 can be sloped with respect to the surface of the water in the tank 116. In some embodiments, one or both of the first and second upper rims 146, 152 includes one or more cutouts, indentations, or other surface features. In at least some cases, the first and second walls 144, 150 are impermeable, such that the first and second containers 138, 140 are impermeable below the first and second openings 148, 154, respectively. In these and other cases, movement of abrasive-containing liquid into and out of the first and second containers 138, 140 can be entirely or nearly entirely through the first and second openings 148, 154, respectively. In contrast to filter bags and other conventional devices for collecting solid particles entrained in liquids, the first and second containers 138, 140 may be relatively durable and low-maintenance. For example, the first and second containers 138, 140 can be unsusceptible to clogging from filtering fine particles or to breakage from rough handling. In some embodiments, the first and second containers 138, 140 are constructed from a polymer, metal, ceramic, and/or other material or combination of materials.

The positions and/or shapes of the first and second containers 138, 140 can be selected to facilitate abrasive collection and convenient removal and replacement. In at least some cases, the first and second containers 138, 140 are peripherally positioned relative to the cutting deck 114. For example, the first container 138 can be spaced apart from the central portion 122 of the cutting deck 114 in a first direction, and the second container 140 can be spaced apart from the central portion 122 of the cutting deck 114 in a second direction opposite to the first direction. As shown in FIGS. 4-6, the first and second containers 138, 140 can be elongate with respective lengths parallel to the first axis (e.g., the y-axis) of the horizontal motion assembly 108 and/or parallel to the slats 126. In some embodiments, the lengths of one or more of the first and second containers 138, 140 extend in a direction parallel to the second axis (e.g., the x-axis) or at an oblique angle to the first or second axes. The first and second containers 138, 140 can also be trough shaped and/or concave at their respective lowermost portions. Furthermore, the first and second containers 138, 140 can be relatively small to facilitate handling. For example, a total interior volume of the first container 138 can be less than 10% (e.g., less than 5%) of a total interior volume of the tank 116. Similarly, a total interior volume of the second container 140 can be less than 10% (e.g., less than 5%) of a total interior volume of the tank 116. Alternatively, the first and second containers 138, 140 can have other suitable positions, shapes, and sizes. Furthermore, waterjet systems in accordance with other embodiments of the present technology may have only one removable container, or may have more than two removable containers. For example, in some embodiments, the waterjet system 100 includes three or more containers configured to collective abrasive from abrasive-containing liquid within the catcher assembly 104. For example, one or more containers can be positioned and installed on each side of the central portion 122 of the cutting deck 144. In some embodiments, one or more containers are positioned within the central portion 122 of the cutting deck 144, outside of the path of the waterjet.

With reference again to FIGS. 1-6, the waterjet system 100 can include quick-release couplings 156 through which the first container 138 and the second container 140 are removably connected to the cutting deck 114. FIG. 7 is an enlarged view of a portion of FIG. 6 showing a given one of the quick-release couplings 156. The quick-release coupling 156 shown in FIG. 6 will now be discussed in detail with the understanding that the other quick-release couplings 156 can have the same or similar features. With reference to FIG. 7, the quick-release coupling 156 can include a flange 158 attached to the second wall 150 of the second container 140, and a protrusion 160 attached to the frame 132 of the cutting deck 114. The flange 158 can include an opening 162 having a wide portion 164 and a narrow portion (not shown) adjoining the wide portion 164. The protrusion 160 can have a head 168 that fits through the wide portion 164 of the opening 162, but does not fit through the narrow portion of the opening 162. The quick-release coupling 156 can be released by shifting a portion of the second container 140 adjacent to the flange 158 inward to align the head 168 of the protrusion 160 with the wide portion 164 of the opening 162, and then lifting this portion of the second container 140 upward. The other quick-release couplings 156 can be operated in a similar manner. In waterjet systems in accordance with other embodiments of the present technology, counterparts of the quick-release couplings 156 can include clamps, screws, hook-and-look fasteners, bayonet fittings, snaps, and/or other suitable coupling components.

Figure 8:
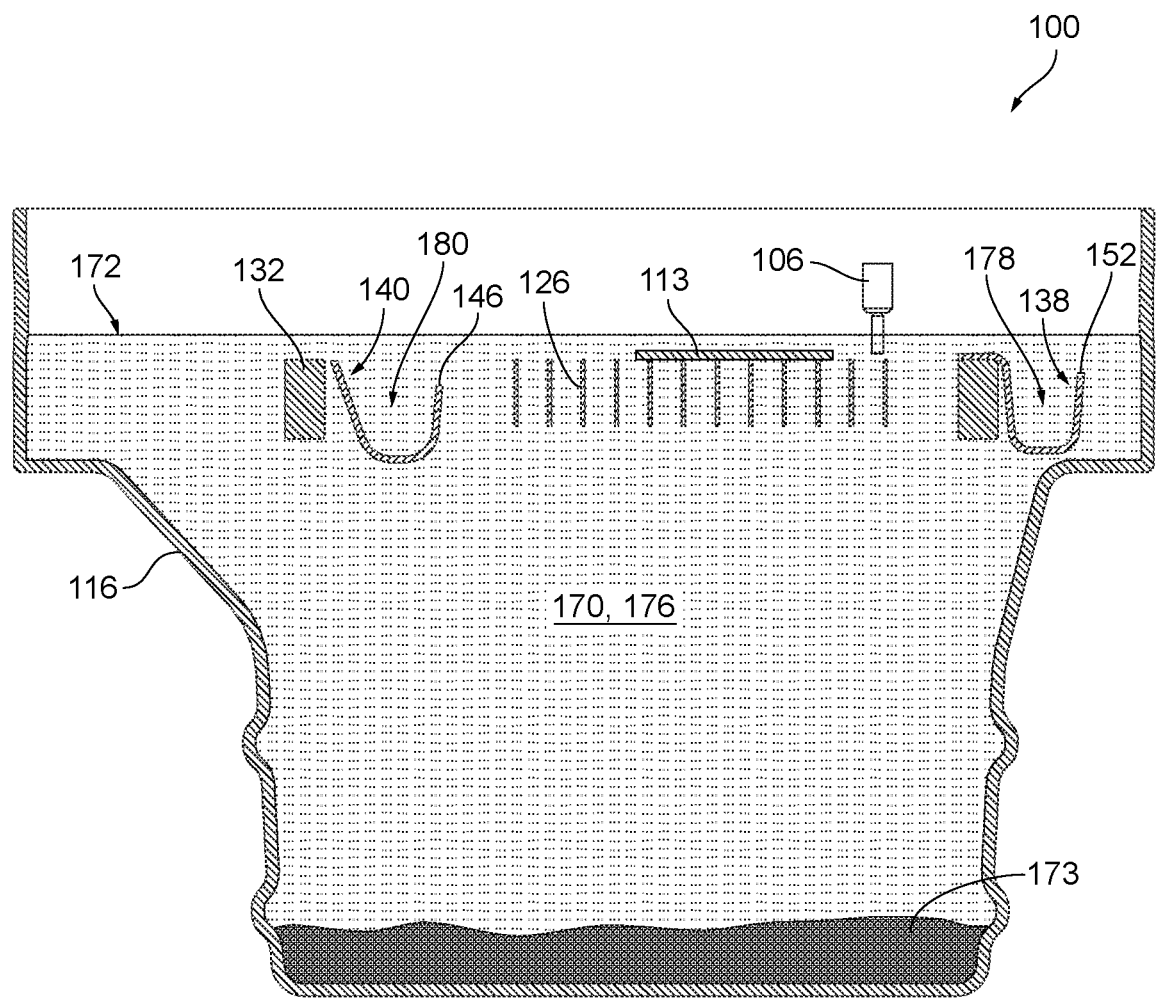
FIGS. 8 and 9 are simplified cross-sectional views taken along the line 8-8 in FIG. 2 showing selected components of the waterjet system shown in FIG. 1 in an inactive state and an active state, respectively.
Figure 9:
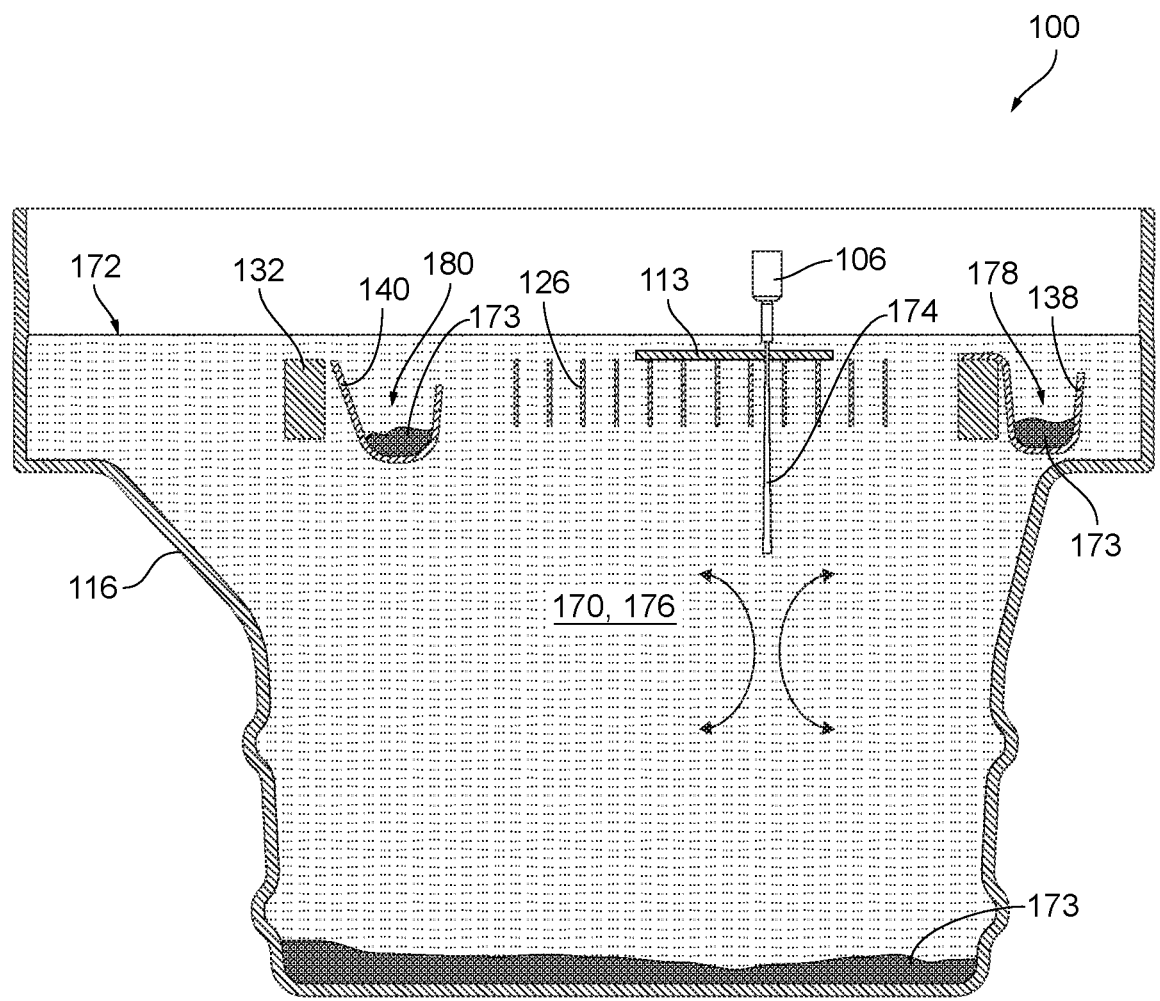

FIGS. 8 and 9 are simplified cross-sectional views taken along the line 8-8 in FIG. 2 showing selected components of the waterjet system 100 in an inactive state and an active state, respectively. As shown in FIGS. 8 and 9, the waterjet system 100 can contain liquid 170 (e.g., water) within the tank 116. In at least some cases, the workpiece 113 and a lowermost portion of the cutting head 106 are submerged (or at least partially submerged) below a surface 172 of the liquid 170. When the waterjet system 100 is in the inactive state (FIG. 8), abrasive 173 from previous operation of the waterjet system 100 may settle into a lowermost portion of the tank 116. When the waterjet system 100 is in the active state (FIG. 9), the cutting head 106 can form a waterjet 174 that impacts against and then passes through the workpiece 113. After passing through the workpiece 113, the waterjet 174 can be absorbed in a bulk volume 176 of the liquid 170. Due to energy from the waterjet 174, turbulence within the bulk volume 176 can be relatively high.

Turbulence from the waterjet 174 can cause some or all of the abrasive 173 at the lowermost portion of the tank 116 to become distributed within the bulk volume 176, even at an uppermost portion of the bulk volume 176 just below the surface 172. The distributed abrasive 173 is not shown in FIGS. 8 and 9 for clarity of illustration. The turbulence can also cause the liquid 170 to migrate between the bulk volume 176 and a first shielded volume 178 of the liquid 170 within the first container 138. Similarly, the turbulence can cause the liquid 170 to migrate between the bulk volume 176 and a second shielded volume 180 of the liquid 170 within the second container 140. During a residence time within either of the first and second containers 138, 140 the abrasive 173 may tend to settle even when the waterjet 174 is active. Mounds of the abrasive 173 may continue to grow while the waterjet 174 is active until a user of the waterjet system 100 removes and empties the first and second containers 138, 140. The first and second containers 138, 140 can be positioned relatively near to the surface 172. For example, the first and second upper rims 146, 152 can be submerged below the surface 172 at most 20% (e.g., at most 10%) of an average depth of the bulk volume 176. This positioning of the first and second upper rims 146, 152 can facilitate convenient removal and replacement of the first and second containers 138, 140. In addition or alternatively, this positioning of the first and second upper rims 146, 152 can cause a desirable rate of circulation of abrasive-containing liquid through the first and second containers 138, 140. A desirable rate of circulation can be a rate that effectively balances promoting abrasive intake with promoting abrasive settling.

Figure 10:
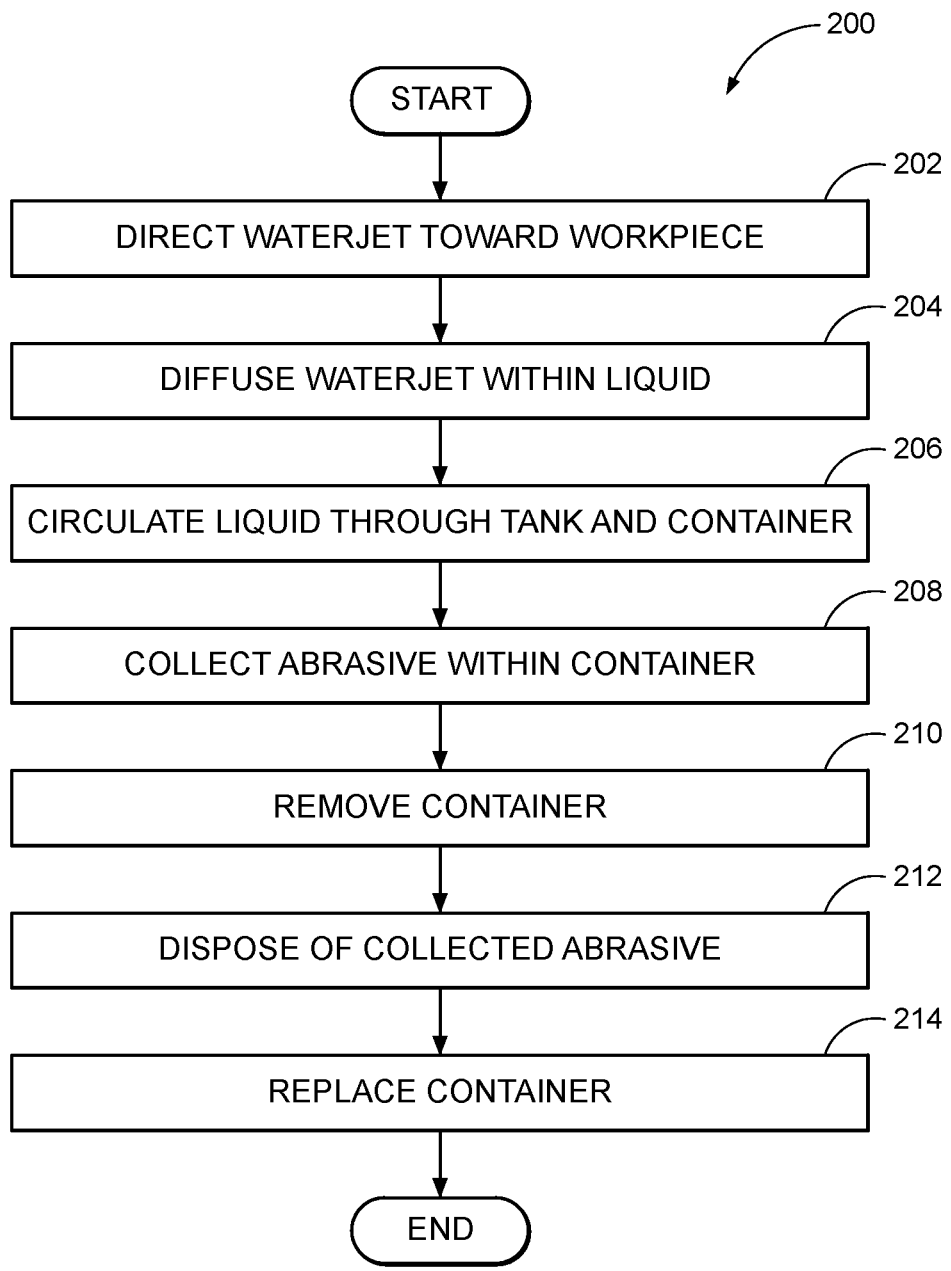
FIG. 10 is a flow chart illustrating a method for operating a waterjet system in accordance with at least some embodiments of the present technology.

FIG. 10 is a flow chart illustrating a method 200 for operating the waterjet system 100 in accordance with at least some embodiments of the present technology. With reference to FIGS. 8-10 together, the method 200 can include directing the waterjet 174 toward the workpiece 113 (block 202). After passing through the workpiece 113, the waterjet 174 can be diffused within the liquid 170 (block 204). This diffusion can cause turbulence within the liquid 170. Relatedly, the method 200 can include circulating the liquid 170 through the tank 116 and through the first and second containers 138, 140 (block 206) at least primarily by the turbulence from diffusing the waterjet 174 within the liquid 170. This circulation can include moving the liquid 170 into and out of the first and second containers 138, 140 via the first and second openings 148, 154, respectively. The method 200 can also include collecting abrasive 173 within the first and second containers 138, 140 (block 208). This collecting can be accomplished at least primarily by shielding the liquid 170 within the first and second containers 138, 140 from at least some of the turbulence from diffusing the waterjet 174 within the liquid 170. While the abrasive 173 is collected, the first and second upper rims 146, 152 can be at least partially submerged in the liquid 170.

When an adequate amount of the abrasive 173 has collected in the first and second containers 138, 140, the method 200 can include removing the first and second containers 138, 140 (block 210). In at least some cases, this includes operating the quick-release couplings 156. Once removed, the first and second containers 138, 140 can be emptied to dispose of the collected abrasive 173 (block 212). Finally the first and second containers 138, 140 can be replaced (block 214). The frequency of removing, emptying, and replacing the first and second containers 138, 140 can be varied to change the rate at which collected abrasive 173 is removed from the liquid 170.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments may also exhibit such advantages, and not all embodiments need necessarily exhibit such advantages or other advantages disclosed herein to fall within the scope of the present technology.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like may be used herein to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not all referring to the same embodiment. Furthermore, various particular features, structures, operations, or characteristics may be combined in any suitable manner in one or more embodiments of the present technology.

I claim:

1. A waterjet system, comprising:
    a cutting head configured to direct an abrasive-containing waterjet toward a workpiece; and
    a catcher assembly including—
    a cutting deck configured to support the workpiece,
    a tank configured to contain abrasive-containing liquid in which the waterjet diffuses after the waterjet passes through the workpiece, and
    a removable container fluidly connected to the tank and configured to be removed from the tank,
    wherein the container is configured to collect abrasive at least primarily by shielding abrasive-containing liquid within the container from at least some turbulence of abrasive-containing liquid within the tank during operation of the waterjet system;
    wherein the container includes a wall having an upper rim configured to be at least partially submerged in abrasive-containing liquid within the catcher assembly during operation of the waterjet system; and
    wherein the upper rim of the wall defines an opening through which abrasive-containing liquid moves into and out of the container during operation of the waterjet system.

2. The waterjet system of claim 1 wherein the catcher assembly includes a coupling through which the container is removably connected to the cutting deck.

3. The waterjet system of claim 1 wherein a lowermost portion of the container is concave.

4. The waterjet system of claim 1 wherein circulation of abrasive-containing liquid through the tank and through the container is at least primarily due to turbulence from the waterjet during operation of the waterjet system.

5. The waterjet system of claim 1 wherein a total interior volume of the container is less than 10% of a total interior volume of the tank.

6. The waterjet system of claim 1 wherein the container is trough shaped.

7. The waterjet system of claim 1 wherein:
    the cutting deck has a central portion at which the cutting deck is configured to support the workpiece;
    the container is a first container spaced apart from the central portion of the cutting deck in a first direction; and
    the catcher assembly includes a second removable container spaced apart from the central portion of the cutting deck in a second direction opposite to the first direction, wherein the second container is fluidly connected to the tank, wherein the second container is configured to collect abrasive at least primarily by shielding abrasive-containing liquid within the second container from at least some turbulence of abrasive-containing liquid within the tank during operation of the waterjet system.

8. The waterjet system of claim 1 wherein:
    the tank has an average depth relative to the surface of abrasive-containing liquid within the catcher assembly during operation of the waterjet system; and
    the upper rim of the wall is positioned to be submerged below the surface of abrasive-containing liquid within the catcher assembly at most 10% of the average depth during operation of the waterjet system.

9. The waterjet system of claim 1 wherein the container is impermeable below the opening.

10. The waterjet system of claim 1, wherein the container has an open top side positioned at least partially submerged in abrasive-containing liquid in the tank during operation of the cutting head.

11. A method for operating a waterjet system, the method comprising:
    directing an abrasive-containing waterjet toward a workpiece supported by a cutting deck of a catcher assembly of the waterjet system;
    diffusing the waterjet within abrasive-containing liquid within a tank of the catcher assembly, wherein diffusing the waterjet causes turbulence within the abrasive-containing liquid within the tank;
    moving abrasive-containing liquid into and out of the container via an opening defined by an upper rim of a wall of the container;
    collecting abrasive within a container fluidly connected to and positioned at least partially within the tank at least primarily by shielding abrasive-containing liquid within the container from at least some of the turbulence while an upper rim of a wall of the container is at least partially submerged in abrasive-containing liquid within the catcher assembly; and removing the container from the tank to dispose of collected abrasive within the container.

12. The method of claim 11 wherein removing the container includes operating a coupling through which the container is removably connected to the cutting deck.

13. The method of claim 11, further comprising circulating abrasive-containing liquid through the tank and through the container at least primarily by the turbulence from diffusing the waterjet within the abrasive-containing liquid.

14. The method of claim 11 wherein:
the container is a first container; and
the method further comprises—
  collecting abrasive within a second container fluidly connected to the tank at least primarily by shielding abrasive-containing liquid within the second container from at least some of the turbulence, and
  removing the second container from the catcher assembly to dispose of collected abrasive within the second container.

15. A waterjet system, comprising:
a cutting head configured to direct an abrasive-containing waterjet toward a workpiece; and
a catcher assembly including—
a cutting deck configured to support the workpiece,
a tank configured to contain abrasive-containing liquid in which the waterjet diffuses after the waterjet passes through the workpiece, and
a container configured to collect abrasive from abrasive-containing liquid that circulates into the container from the tank at least primarily due to turbulence from the waterjet during operation of the waterjet system; and
a coupling through which the container is removably connected to the cutting deck;
wherein the container includes a wall having an upper rim configured to be at least partially submerged in abrasive-containing liquid within the catcher assembly during operation of the waterjet system; and
wherein the upper rim of the wall defines an opening through which abrasive-containing liquid moves into and out of the container during operation of the waterjet system.

* * * * *